US011104259B2

(12) United States Patent
Wurm

(10) Patent No.: US 11,104,259 B2
(45) Date of Patent: Aug. 31, 2021

(54) MOTORCYCLE TRANSPORTING ASSEMBLY

(71) Applicant: Kenneth Wurm, Maple Lake, MN (US)

(72) Inventor: Kenneth Wurm, Maple Lake, MN (US)

(*) Notice: Subject to any disclaimer, the term of this patent is extended or adjusted under 35 U.S.C. 154(b) by 126 days.

(21) Appl. No.: 16/540,671

(22) Filed: Aug. 14, 2019

(65) Prior Publication Data

US 2021/0046859 A1 Feb. 18, 2021

(51) Int. Cl.
*B60P 3/077* (2006.01)
*B62H 3/08* (2006.01)

(52) U.S. Cl.
CPC ............... *B60P 3/077* (2013.01); *B62H 3/08* (2013.01)

(58) Field of Classification Search
CPC .................................. B60P 3/077; B62H 3/08
USPC ............................................................. 410/3
See application file for complete search history.

(56) References Cited

U.S. PATENT DOCUMENTS

| | | | | |
|---|---|---|---|---|
| 6,287,069 B1* | 9/2001 | Oliphant | ............. | B25H 1/0014 414/426 |
| 6,575,310 B2 | 6/2003 | Chamoun | | |
| D495,107 S | 8/2004 | Thurm | | |
| 6,827,543 B2* | 12/2004 | O'Neil | ...................... | B60P 3/07 414/537 |
| 7,150,359 B1* | 12/2006 | Lyons | ..................... | B62H 3/08 211/20 |
| D596,823 S * | 7/2009 | Thurm | .......................... | D34/28 |
| 9,505,333 B2 | 11/2016 | Jobe | | |
| 2007/0297886 A1* | 12/2007 | Bruce | ..................... | B60P 3/079 414/462 |
| 2010/0207085 A1* | 8/2010 | Thurm | .................. | B66F 7/0641 254/2 C |
| 2011/0027034 A1* | 2/2011 | Chamoun | ................ | B60P 7/15 410/104 |
| 2012/0321407 A1 | 12/2012 | Lindsey | | |
| 2015/0329059 A1* | 11/2015 | Jobe | .......................... | B60R 9/06 224/403 |
| 2015/0343938 A1* | 12/2015 | Graham | .................. | B60P 3/077 410/3 |
| 2018/0361903 A1* | 12/2018 | Dees | ..................... | B62B 5/0093 |
| 2020/0331551 A1* | 10/2020 | Errickson, Jr. | .......... | B62H 3/08 |

* cited by examiner

*Primary Examiner* — Hilary L Gutman

(57) ABSTRACT

A motorcycle transporting assembly for transporting a motorcycle includes a frame that is positionable to lie on a bed of a cargo vehicle. A frame support is coupled between the outward members and the frame support is positioned adjacent to the distal end of each of the outward members. A pair of retainers is provided and each of the retainers is slidably coupled to the frame. Each of the retainers abuts the respective wheel well thereby inhibiting the frame from is urged rearwardly out of the bed. A cradle is coupled to the frame to receive a wheel of a motorcycle thereby facilitating the motorcycle to be retained in an upright position in the bed of the vehicle for transporting the motorcycle.

10 Claims, 6 Drawing Sheets

MOTORCYCLE TRANSPORTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transporting devices and more particularly pertains to a new transporting device for transporting a motorcycle.

(2) Description of Related Art Including Information Disclosed Under 37 CFR 1.97 and 1.98

The prior art relates to transporting devices.

BRIEF SUMMARY OF THE INVENTION

An embodiment of the disclosure meets the needs presented above by generally comprising a frame that is positionable to lie on a bed of a cargo vehicle. A frame support is coupled between the outward members and the frame support is positioned adjacent to the distal end of each of the outward members. A pair of retainers is provided and each of the retainers is slidably coupled to the frame. Each of the retainers abuts the respective wheel well thereby inhibiting the frame from is urged rearwardly out of the bed. A cradle is coupled to the frame to receive a wheel of a motorcycle thereby facilitating the motorcycle to be retained in an upright position in the bed of the vehicle for transporting the motorcycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
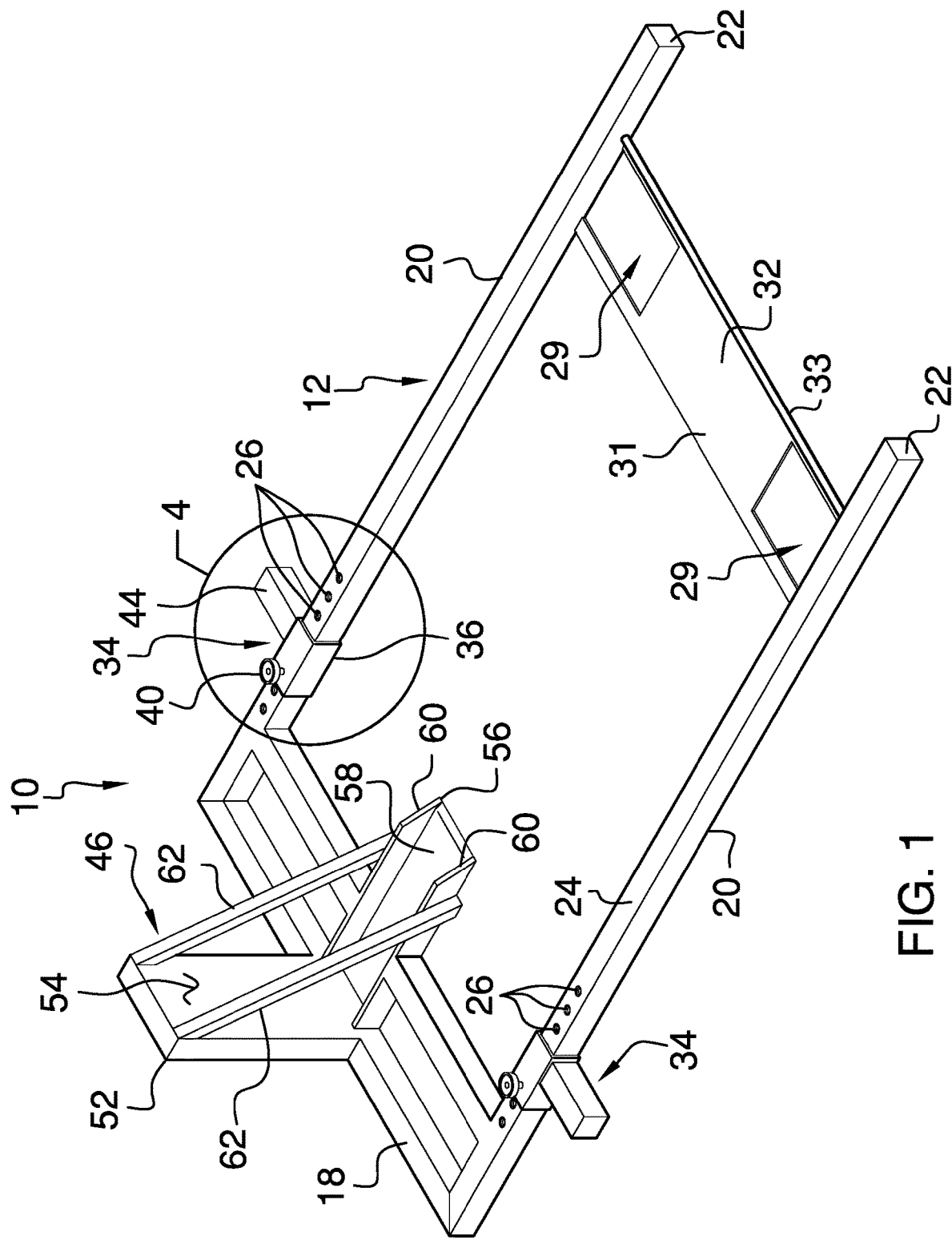
FIG. 1 is a perspective view of a motorcycle transporting assembly according to an embodiment of the disclosure.
Figure 2:
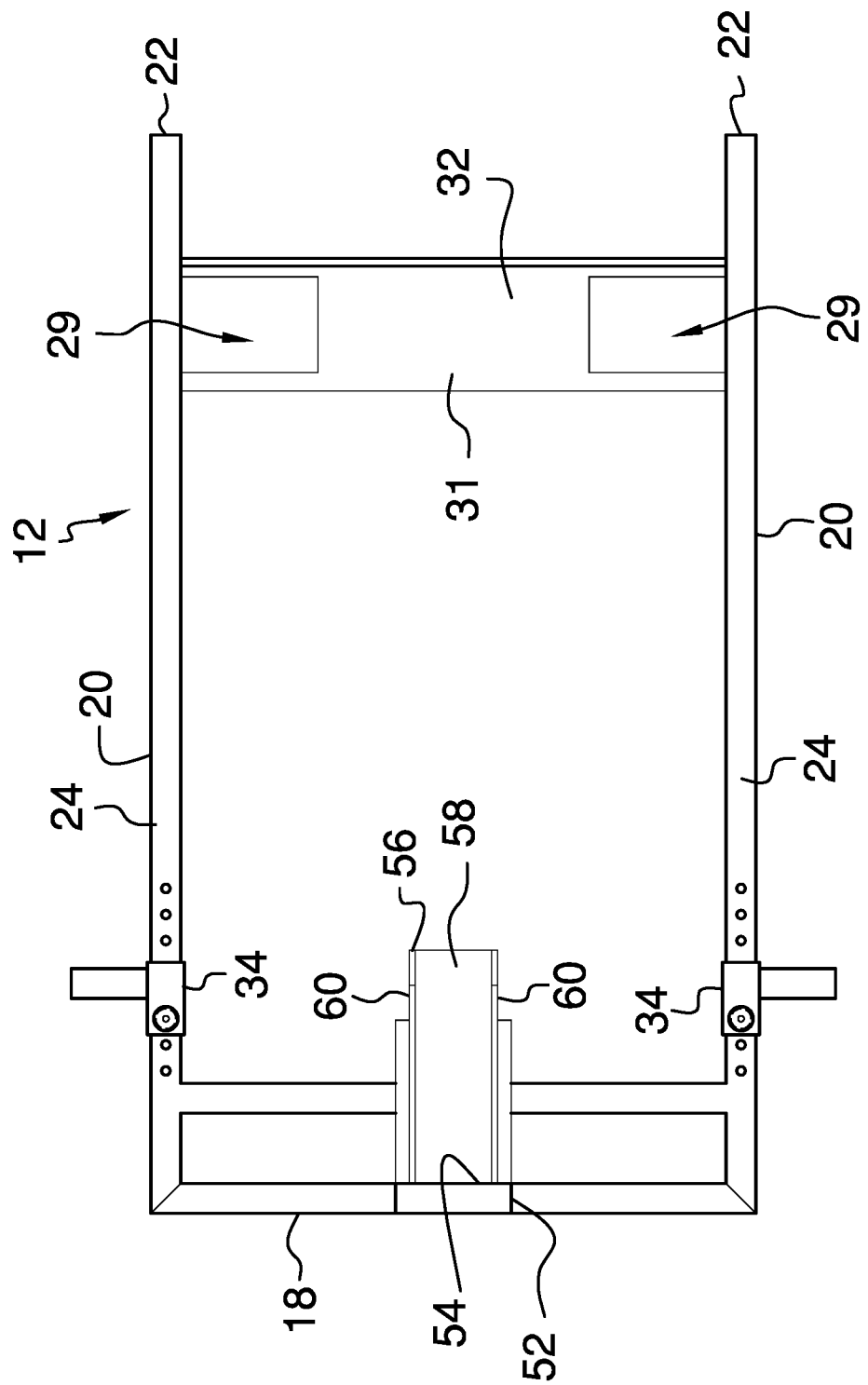
FIG. 2 is a top view of an embodiment of the disclosure.
Figure 3:
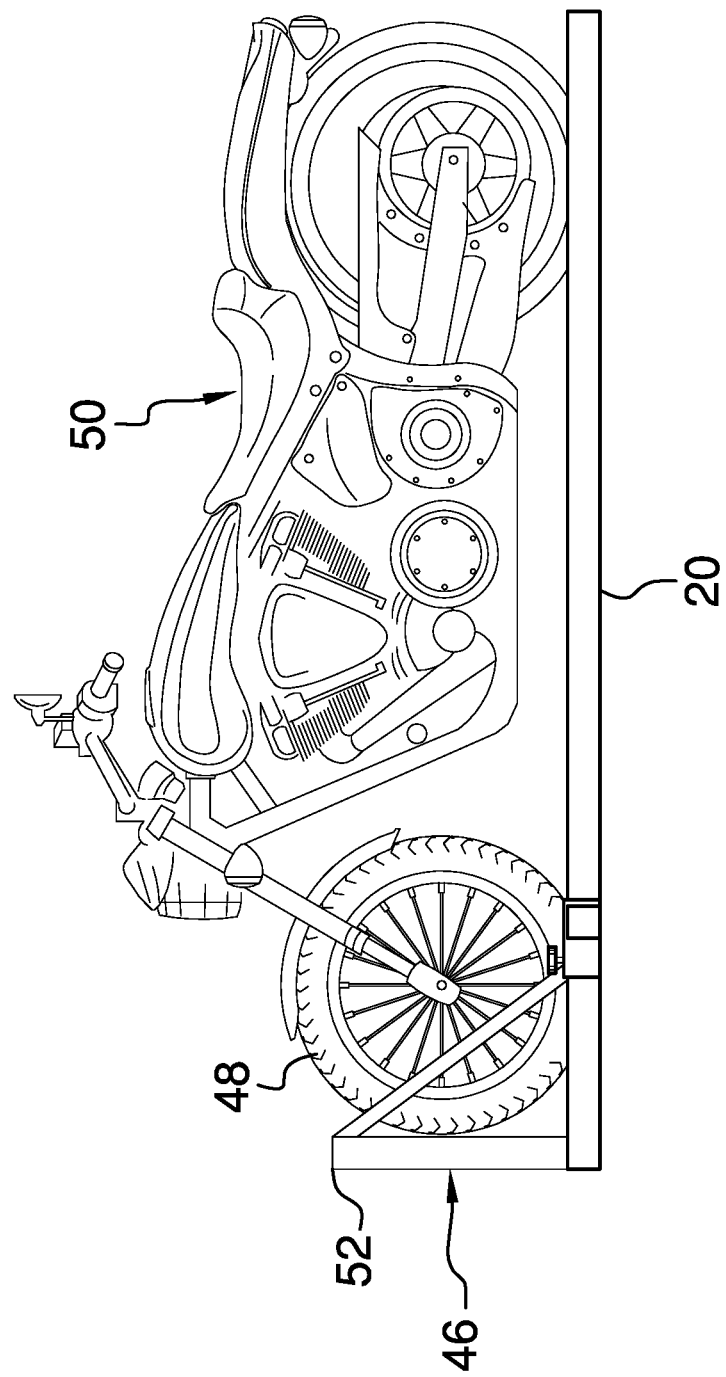
FIG. 3 is a left side view of an embodiment of the disclosure.
Figure 4:
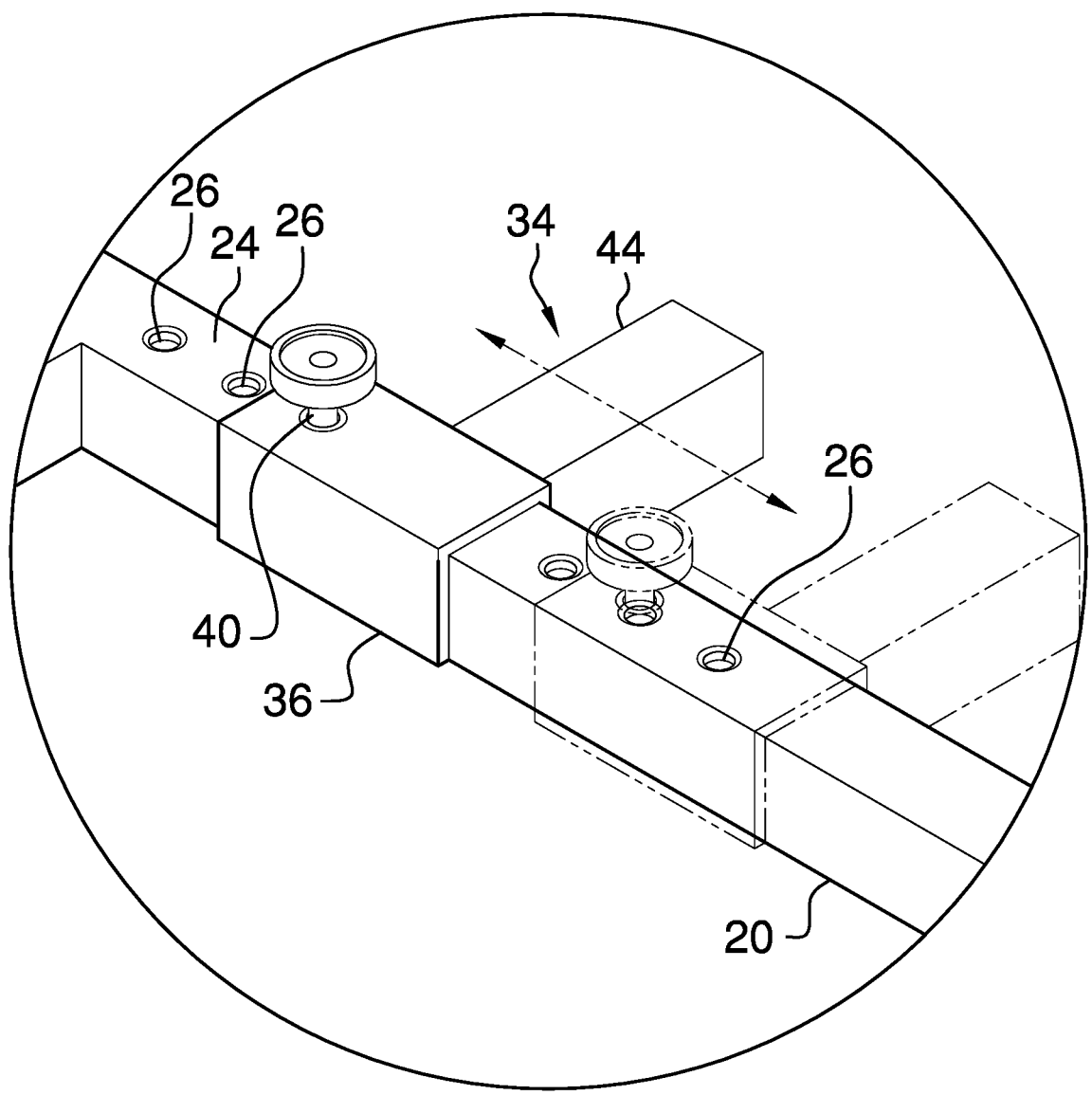
FIG. 4 is a detail view of a retainer taken from circle 4 of FIG. 1 of an embodiment of the disclosure.
Figure 5:
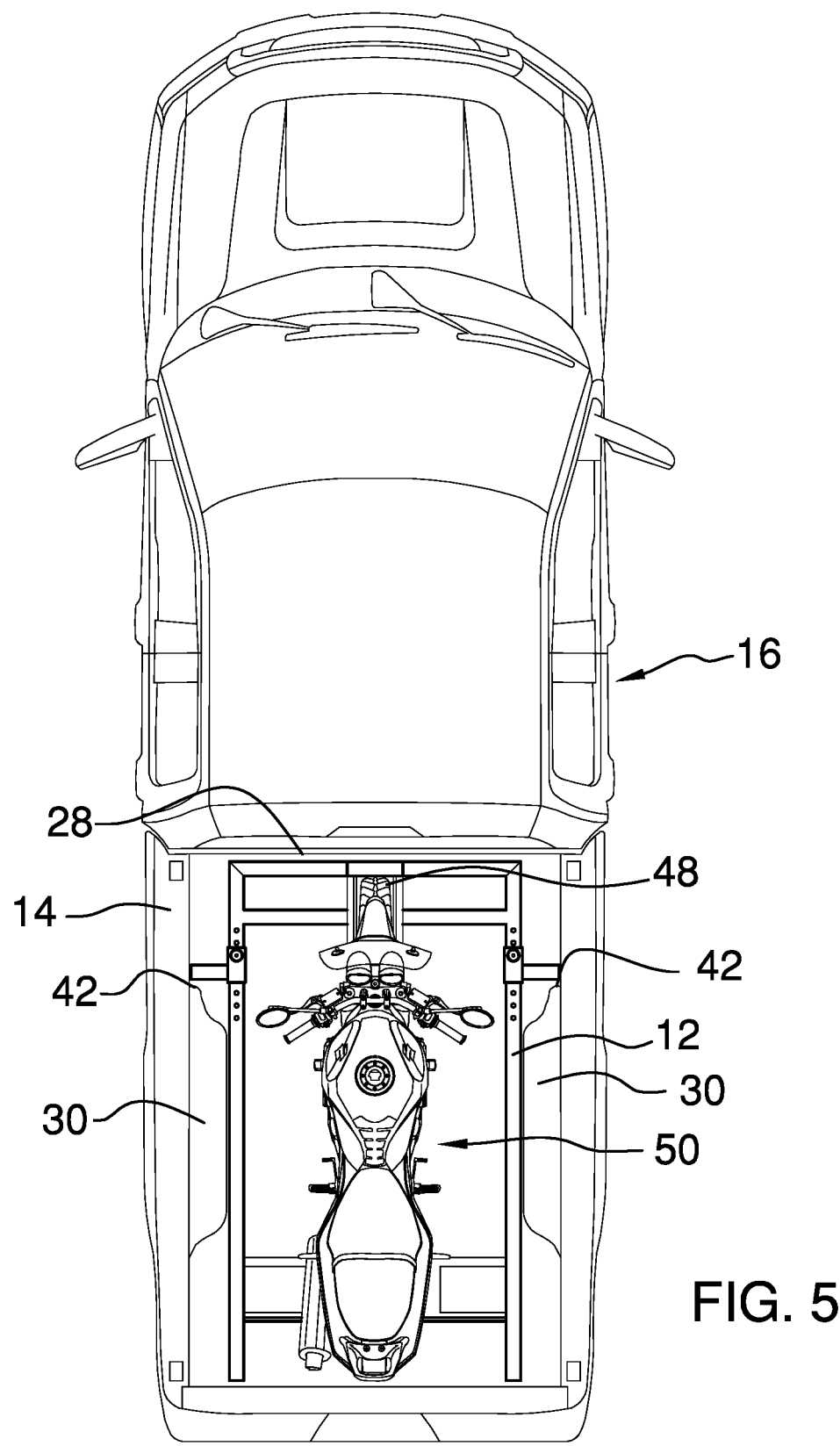
FIG. 5 is a perspective in-use view of an embodiment of the disclosure.
Figure 6:
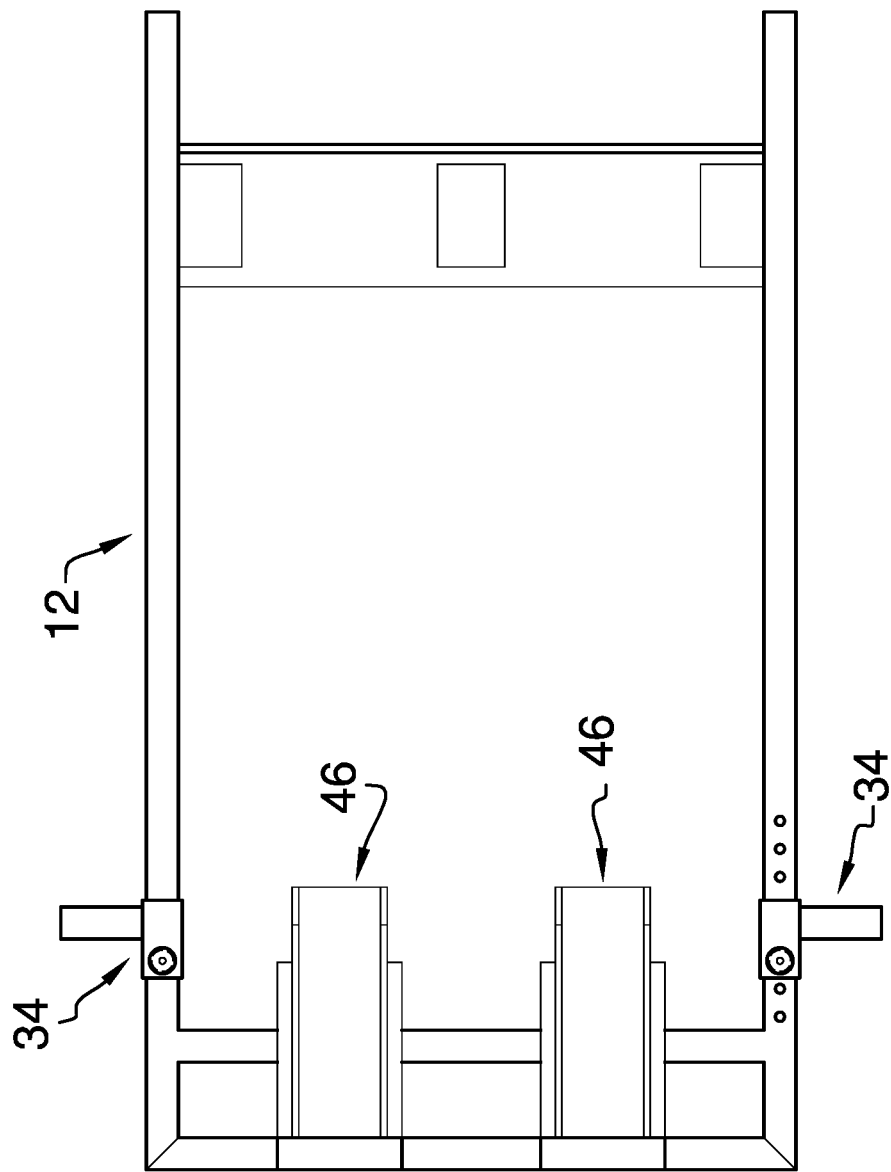
FIG. 6 is a perspective view of an alternative embodiment of the disclosure.

With reference now to the drawings, and in particular to FIGS. 1 through 6 thereof, a new transporting devices embodying the principles and concepts of an embodiment of the disclosure and generally designated by the reference numeral 10 will be described.

As best illustrated in FIGS. 1 through 6, the motorcycle transporting assembly 10 generally comprises a frame 12 that is positionable to lie on a bed 14 of a cargo vehicle 16. The frame 12 has a central member 18 extending between a pair of outward members 20, and each of the outward members 20 has a distal end 22 with respect to the central member 18. Each of the outward members 20 has a top side 24 and each of the outward members 20 has a plurality of apertures 26 each extending through the top side 24. The apertures 26 on each of the outward members 20 are spaced apart from each other and are distributed from the central member 18 toward the distal end 22.

The frame 12 is positionable in the bed 14 having the central member 18 extending along a front wall 28 of the bed 14 and having each of the outward members 20 extending next to a respective one of a pair of wheel wells 30 in the bed 14 toward a back end of the bed 14. The cargo vehicle 16 may be a pickup that is driven on public roads and the bed 14 may be structured according to any vehicle manufacturer's design. A frame support 32 is coupled between the outward members 20 and the frame support 32 is positioned adjacent to the distal end 22 of each of the outward members 20. The frame support 32 retains the frame 12 in a rectangular shape. The frame support 32 may have a pair of openings 29 extending through a top side 31 and a bottom side 33 of the frame support 32.

A pair of retainers 34 is provided and each of the retainers 34 is slidably coupled to the frame 12. Each of the retainers 34 is positionable at a spot on the frame 12 that aligns the retainers 34 with a respective one of the wheel wells 30 in the bed 14. Moreover, each of the retainers 34 abuts the respective wheel well 30 thereby inhibiting the frame 12 from being urged rearwardly out of the bed 14. In this way the retainers 34 facilitate the frame 12 to be retained in a variety of different beds of cargo vehicles. Additionally, the retainers 34 facilitate the frame 12 to be retained in the bed 14 without permanently attaching the frame 12 to the bed 14. In this way the frame 12 can easily be moved from one vehicle to another.

Each of the retainers 34 is positioned around a respective one of the outward members 20 of the frame 12. Each of the retainers 34 comprises a sleeve 36 that is slidably positioned around the respective outward member 20. A screw 40 extends through the sleeve 36 and the screw 40 is tightenable to extend into a respective one of the apertures 26 in the respective outward member 20. In this way the sleeve 36 can be retained at a selected point along the respective outward member 20 thereby aligning the sleeve 36 with a front surface 42 of a respective one of the wheel wells 30. The screw 40 might include a knob or the like for gripping and subsequently either tightening or loosening the screw 40.

Each of the retainers 34 includes a rod 44 that is coupled to and extends laterally away from the sleeve 36. The rod 44 abuts the front surface 42 of the respective wheel well 30. In this way the frame 12 is inhibited from sliding rearwardly out of the bed 14 of the cargo vehicle 16. Thus, the frame 12 can be retained in a variety of cargo vehicles.

A cradle 46 is coupled to the frame 12 wherein the cradle 46 is configured to receive a wheel 48 of a motorcycle 50. In this way the motorcycle 50 is retained in an upright position in the bed 14 of the vehicle 16 for transporting the motorcycle 50. The cradle 46 comprises a stop 52 that is coupled to and extends upwardly from the central member 18 of the frame 12. The wheel 48 of the motorcycle 50 is positioned against the stop 52 when the wheel 48 of the motorcycle 50 is positioned in the cradle 46. The stop 52 is centrally positioned between the outward members 20 and the stop 52 has a rear surface 54.

A channel 56 is coupled to and extends away from the rear surface 54 of the stop 52. The wheel 48 of the motorcycle 50 is rolled onto the channel 56 when the wheel 48 of the motorcycle 50 is positioned in the cradle 46. The channel 56 is oriented collinear with each of the outward members 20 of the frame 12. The channel 56 has a lower panel 58 and a pair of vertical panels 60 each extending upwardly from the lower panel 58. The vertical panels 60 laterally restrain the wheel 48 of the motorcycle 50 when the wheel 48 of the motorcycle 50 is rolled onto the channel 56. A pair of cradle supports 62 is each coupled between the stop 52 and the channel 56 for retaining the channel 56 at a perpendicular orientation with respect to the stop 52. As is most clearly shown in FIG. 6, a pair of cradles 46 may be coupled to the frame 12 for transporting a pair of motorcycles.

In use, the frame 12 is laid on the bed 14 of the cargo vehicle 16 such that the central member 18 extends along the front wall 28 of the bed 14 and each of the outward members 20 extends toward the back end of the bed 14. Each of the retainers 34 is slid on the respective outward members 20 to abut the rod 44 against the front surface 42 of the respective wheel well 30. The screw 40 on each of the retainers 34 is tightened to engage a respective one of the apertures 26 in the respective outward member 20. In this way the frame 12 is retained in the bed 14 without the use of permanent fasteners. The motorcycle 50 is rolled into the bed 14 and the wheel 48 of the motorcycle 50 is rolled into the cradle 46. The motorcycle 50 can be secured with tie down straps or other preferred means of securing the motorcycle 50 in the bed 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorcycle transporting assembly comprising:
a frame being positionable to lie on a bed of a cargo vehicle, wherein said frame has a central member extending between a pair of outward members;
a frame support being coupled between said outward members, said frame support being positioned adjacent to a distal end of each of said outward members;
a pair of retainers, each of said retainers being slidably coupled to said frame, each of said retainers being positionable at a spot on said frame that aligns said retainers with a respective one of a pair of wheel wells in the bed, each of said retainers abutting the respective wheel well thereby inhibiting said frame from being urged rearwardly out of the bed, each of said retainers being positioned around a respective one of said outward members of said frame; and
a cradle being coupled to said frame wherein said cradle is configured to receive a wheel of a motorcycle thereby facilitating said motorcycle to be retained in an upright position in the bed of the vehicle for transporting the motorcycle.

2. The assembly according to claim 1, wherein each of said outward members has a top side, each of said outward members having a plurality of apertures each extending through said top side, said apertures on each of said outward members being spaced apart from each other and being distributed from said central member toward said distal end.

3. The assembly according to claim 2, wherein said frame is positionable in said bed having said central member extending along a front wall of said bed and having each of said outward members extending next to a respective one of the pair of wheel wells in said bed toward a back end of said bed.

4. The assembly according to claim 3, wherein each of said retainers comprises a sleeve being slidably positioned around said respective outward member.

5. The assembly according to claim 4, further comprising a screw extending through said sleeve, said screw being tightenable to extend into a respective one of said apertures in said respective outward member for retaining said sleeve at a selected point along said respective outward member thereby aligning said sleeve with a front surface of a respective one of said wheel wells.

6. The assembly according to claim 5, further comprising a rod being coupled to and extending laterally away from said sleeve, said rod abutting said front surface of said receptive wheel well thereby inhibiting said frame from sliding rearwardly out of said bed of said cargo vehicle wherein said frame is configured to be retained in a variety of cargo vehicles.

7. The assembly according to claim 2, wherein said cradle comprises a stop being coupled to and extending upwardly from said central member of said frame wherein said stop is configured to have said wheel of said motorcycle positioned thereagainst, said stop being centrally positioned between said pair of outward members, said stop having a rear surface.

8. The assembly according to claim 7, wherein said cradle comprises a channel being coupled to and extending away from said rear surface of said stop, wherein said channel is configured to have said wheel of said motorcycle rolled thereon, said channel being oriented collinear with each of said pair of outward members of said frame, said channel having a lower panel and a pair of vertical panels each extending upwardly from said lower panel, wherein each of said vertical panels is configured to laterally restrain said wheel of said motorcycle when said wheel of said motorcycle is rolled onto said channel.

9. The assembly according to claim 8, Wherein said cradle comprises a pair of cradle supports, each of said cradle supports being coupled between said stop and said channel for retaining said channel at a perpendicular orientation with respect to said stop.

10. A motorcycle transporting assembly comprising:
a frame being positionable to lie on a bed of a cargo vehicle, said frame having a central member extending between a pair of outward members, each of said outward members having a distal end with respect to said central member, each of said outward members having a top side, each of said outward members having a plurality of apertures each extending through said top side, said apertures on each of said outward members being spaced apart from each other and being distributed from said central member toward said distal end, said frame being positionable in said bed having said central member extending along a front wall of said bed and having each of said outward members extending next to a respective one of a pair of wheel wells in said bed toward a back end of said bed;
a frame support being coupled between said outward members, said frame support being positioned adjacent to said distal end of each of said outward members;
a pair of retainers, each of said retainers being slidably coupled to said frame, each of said retainers being positionable at a spot on said frame that aligns said retainers with a respective one of said wheel wells in said bed, each of said retainers abutting said respective wheel well thereby inhibiting said frame from being urged rearwardly out of said bed, each of said retainers being positioned around a respective one of said outward members of said frame, each of said retainers comprising:
  a sleeve being slidably positioned around said respective outward member;
  a screw extending through said sleeve, said screw being tightenable to extend into a respective one of said apertures in said respective outward member for retaining said sleeve at a selected point along said respective member thereby aligning said sleeve with a front surface of a respective one of said wheel wells; and
  a rod being coupled to and extending laterally away from said sleeve, said rod abutting said front surface of said receptive wheel well thereby inhibiting said frame from sliding rearwardly out of said bed of said cargo vehicle; and
a cradle being coupled to said frame wherein said cradle is configured to receive a wheel of a motorcycle thereby facilitating said motorcycle to be retained in an upright position in said bed of said cargo vehicle for transporting said motorcycle, said cradle comprising:
  a stop being coupled to and extending upwardly from said central member of said frame wherein said stop is configured to have said wheel of said motorcycle positioned thereagainst, said stop being centrally positioned between said outward members, said stop having a rear surface,
  a channel being coupled to and extending away from said rear surface of said stop, wherein said channel is configured to have said wheel of said motorcycle rolled thereon, said channel being oriented collinear with each of said outward members of said frame, said channel having a lower panel and a pair of vertical panels each extending upwardly from said lower panel, wherein each of said vertical panels is configured to laterally restrain said wheel of said motorcycle when said wheel of said motorcycle is rolled onto said channel; and
  a pair of cradle supports, each of said cradle supports being coupled between said stop and said channel for retaining said channel at a perpendicular orientation with respect to said stop.

* * * * *